UNITED STATES PATENT OFFICE.

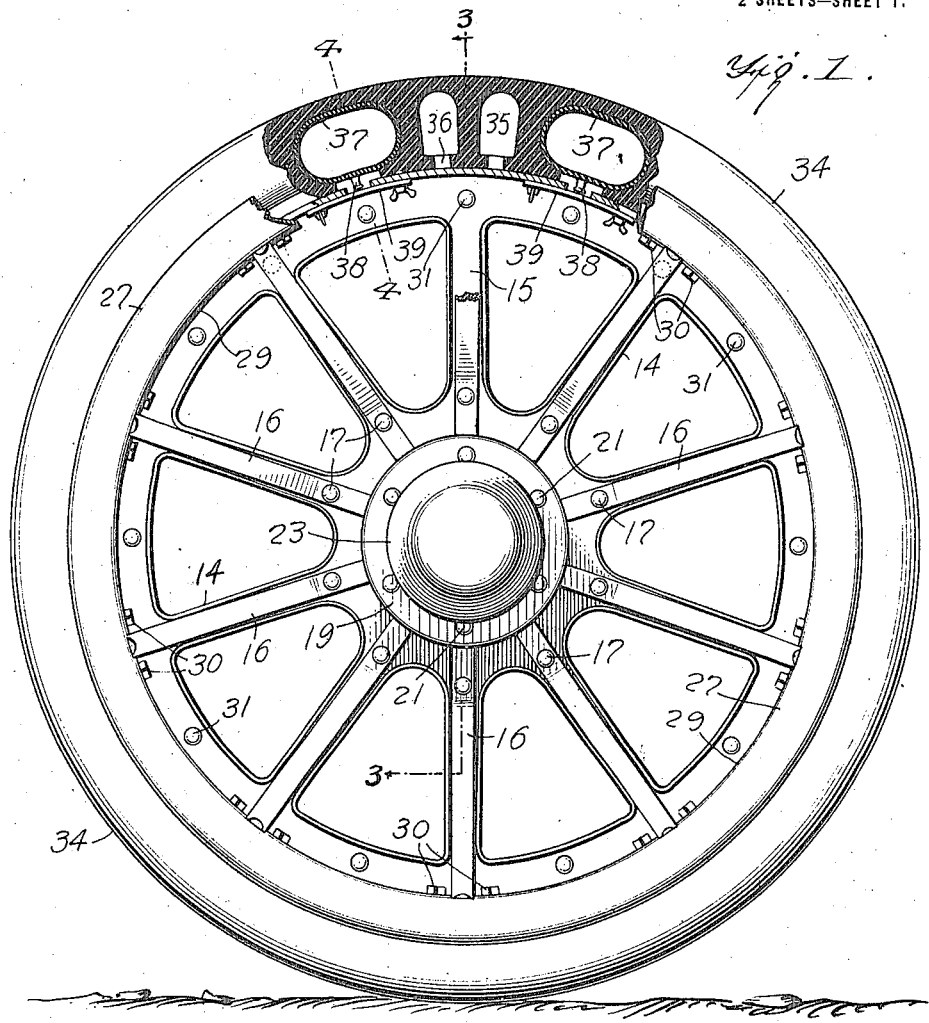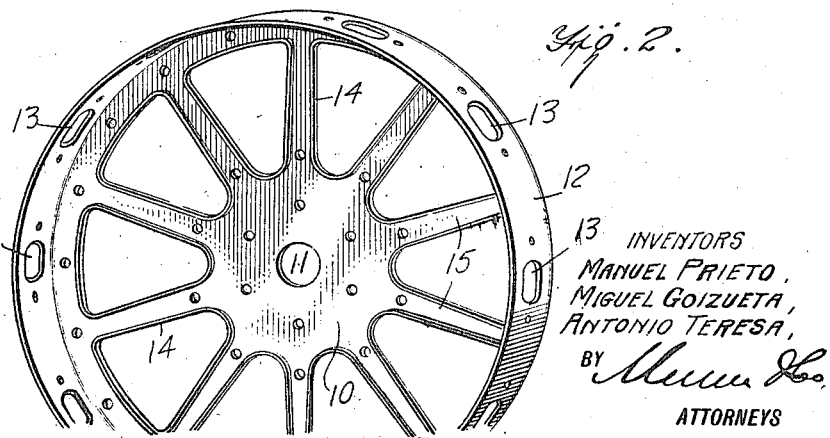

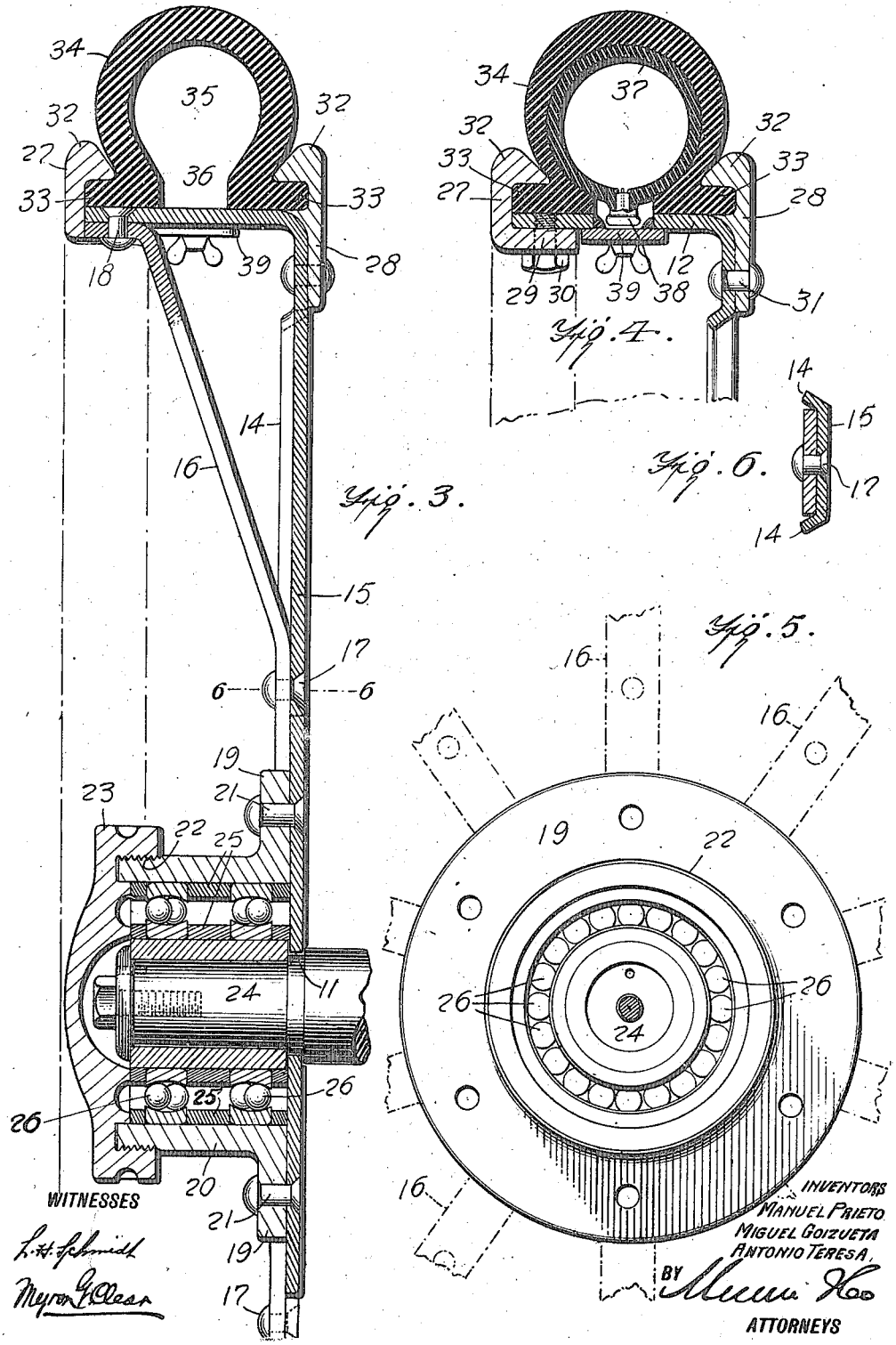

MANUEL PRIETO, ANTONIO TERESA, AND MIGUEL GOIZUETA, OF HABANA, CUBA.

VEHICLE-WHEEL.

1,233,126.  Specification of Letters Patent.  Patented July 10, 1917.

Application filed October 13, 1916. Serial No. 125,367.

*To all whom it may concern:*

Be it known that we, MANUEL PRIETO and ANTONIO TERESA, subjects of the King of Spain, and MIGUEL GOIZUETA, a citizen of the Republic of Cuba, all residents of Habana, in the Republic of Cuba, have made certain new and useful Improvements in Vehicle-Wheels, of which the following is a specification.

Our present invention relates generally to vehicle wheels and more particularly to vehicle wheels adapted to a certain type of tire, our object being to provide a wheel particularly adapted to the type of tire to be hereinafter described, which may be readily formed much more quickly and cheaply than heretofore possible, which will be strong and durable in use and which will present the advantages to be presently outlined as regards the several structural parts thereof.

In the accompanying drawings illustrating our present invention—

Figure 1 is a side elevation in section partly broken away illustrating our invention;

Fig. 2 is a detail perspective view of the body of the wheel removed;

Fig. 3 is a transverse vertical section taken substantially on the line 3—3 of Fig. 1;

Fig. 4 is a longitudinal section through the rim portion of the wheel taken substantially on the line 4—4 of Fig. 1;

Fig. 5 is an elevation of the hub portion with the hub cap removed, and

Fig. 6 is a detail cross section taken substantially on the line 6—6 of Fig. 3.

Referring now to these figures, our invention contemplates the provision of a wheel, the body portion 10 of which as seen particularly in Fig. 2, is stamped from a single piece of sheet metal of suitable dimensions and gage, the section of metal so utlized being provided with a central opening 11, and with a laterally extending peripheral flange 12, the latter of which is substantially flat and provided with spaced slotted openings 13 in an annular series and for a purpose to be presently described.

The body 10 is also at the same time provided with a series of substantially triangular cut out portions and with flanges 14 around the said cut out portions projecting in the same direction as the annular flange 12, which latter forms the rim of the wheel.

The cut out portions just above mentioned form between them a plurality of radial webs 15 constituting the spokes of the complete wheel, which are strengthened by the flanges 14 around the cut out portions. For further strengthening the webs 15, they may be connected to the flange 12 by a plurality of angular braces 16, the inner portions of which as best seen in Figs. 3 and 6 are riveted to the inner portions of the spokes 15, as at 17, and the outer portions of which are similarly riveted as at 18, to the inner surface of the annular flange 12 adjacent the free edge of the latter. The ends of these angular braces 16 are preferably bent into flatwise contact respectively with the spokes 15 and the flange 12 as shown.

Inwardly beyond the several cut out portions between the spokes 15, the body 10 has a portion surrounding its central opening 11, to which the inner annular flange 19 of the cylindrical hub 20 is secured as by means of an annular series of rivets 21, the outer end of the cylindrical hub 20 being threaded as at 22 for engagement by a threaded cap 23, closing the outer open end of the hub 20 to prevent the entrance of dust and dirt into the bearings.

The opening 11 centrally of the body 10 provides for the reception of the axle spindle 24 as seen in Fig. 3, between which and the hub 20 are disposed the bearing rings 25 with their bearings 26, both of which may be of the usual construction.

The outer flange 12 which as before stated forms the rim of the wheel, is adjacent its inner and outer edges, encircled by a pair of tire clamping rings 27 and 28, the former of which has an inner flange 29 extending adjacent the inner surface of the rim 12 and bolted thereto by bolts 30 providing for the ready detachment of said rim. The ring 28 is on the other hand extended inwardly and riveted to the outer portion of the body 10 adjacent its flange 12 by an annular series of rivets 31, both of the rings 27 and 28 having outer inwardly projecting annular rivets 32 for engagement with the laterally projecting inner flanges 33 of a tire 34 of the type shown having an inner substantially flat peripheral portion in order that it may seat evenly and firmly upon the outer flat surface of the rim 12 for convenient and effective engagement by the rings 27 and 28 in the manner just previously described.

The tire, for the use of which our improved wheel is particularly designed, has a rounded body portion much resembling that of the usual type, the inner flanges 33 however, projecting within the sides of the body portion of the tire so that the clamping rings 27 and 28 engage with the tire as particularly seen in Figs. 3 and 4. The said rings will lie substantially beyond the sides of the tire and thus form a material protection therefor in use, to prevent side abrasions, cuts and other disfiguration of the tire in approaching curves, or any possible conflict with other vehicles. The tire 34 is further provided with an annular series of cells 35 from which openings 36 as seen in Fig. 1, extend through the inner periphery thereof. Inflatable tubes 37 are disposed in certain of the cells, with their inner valves 38 extending into the rim openings 13 before mentioned so that the tubes 37 may be individually removed, inflated or repaired through the rim openings 13, without removing the tire 35 from the wheel, the rim openings 13 being preferably closed in the normal use of the tire by means of plates 39 detachably bolted upon the inner peripheral surface of the rim 12 as seen particularly in Figs. 1 and 4.

Thus by virtue of its one-piece body construction, our improved wheel may be readily, quickly and economically formed, and with the rings 27 and 28 in position with or without the braces 16, its outer flanged rim portion 12 will be effectively braced and capable of sustaining considerable weight.

It is also to be observed, that by virtue of our particular construction, including the attachment with the hub 20 to the central portion of the one-piece body of the wheel, as well as the connection thereto of the rings 27 and 28, said hub and said rings may in the event of collapse of the body portion of the wheel be removed and utilized in connection with other wheel bodies of similar type so as to obviate the necessity of discarding the entire wheel.

It will be further seen by reference particularly to Fig. 3, that the inner face of the wheel constructed in accordance with our invention is substantially unbroken and in a straight vertical line, singularly devoid of all projecting parts which ordinarily interfere with the connection of brake bands and other vehicular parts, and that the hub 20 with its cap 23 extending as it does in an outward direction, is wholly within the space circumscribed by the flanged rim 12 with its rings 27 and 28, and thus within the lateral limits of the wheel rim so that it may be prevented from injurious contact with obstacles or other vehicles in the use of the wheel.

We claim:—

1. A vehicle wheel comprising a stamped body having a central opening and an outer annular flange forming a flat rim portion, a hub secured around the central opening and to the said body and projecting therefrom in the direction of the flanged rim portion, and annular rings secured at the respectively opposite edges of the flanged rim portion, said hub having a cap at its outer end and terminating at its said outer end within the limits circumscribed by the flange and its said rings.

2. A vehicle wheel comprising a stamped body having a central opening and an outer annular flange forming a flat rim portion, a hub secured around the central opening and to the said body and projecting therefrom in the direction of the flanged rim portion, and annular rings secured at the respectively opposite edges of the flanged rim portion, said body having an annular series of cut out portions between its hub and its flanged rim leaving webs between the same forming the spokes of the wheel and inclined braces secured at their inner ends to the inner portions of said webs and at their outer ends to the flanged rim at points adjacent the free edge of the latter.

3. A vehicle wheel comprising a stamped body portion having a central opening and an outer annular and substantially flat flange forming the wheel rim and provided with a plurality of openings, clamping rings at the relatively opposite edges of said flanged rim, a hub secured centrally of the body around its opening, and plates detachably connected around the inner surface of the rim portion and normally covering the said openings thereof.

MANUEL PRIETO.
ANTONIO TERESA.
MIGUEL GOIZUETA.